UNITED STATES PATENT OFFICE.

EMILE BRONNERT, OF NIEDERMORSCHWEILER, GERMANY, ASSIGNOR TO VEREINIGTE GLANZSTOFF-FABRIKEN A. G., OF ELBERFELD, GERMANY.

METHOD OF RECOVERING AMMONIA IN THE CUPRAMMONIUM CELLULOSE PRECIPITATION.

1,023,548.  Specification of Letters Patent.  Patented Apr. 16, 1912.

No Drawing.  Application filed January 17, 1911. Serial No. 603,094.

*To all whom it may concern:*

Be it known that I, EMILE BRONNERT, a subject of the German Emperor, residing at Niedermorschweiler, Germany, have invented certain new and useful Improvements in the Method of Utilizing Cellulose Wash Liquors from the Cuprammonia Process, of which the following is a specification.

When subjecting to precipitation, solutions of cellulose in cuprammonia, for the production of artificial articles, and especially when this is done with alkaline agents, according to the recently developed practice, the ammonia which is no longer required as a solvent, will escape. Heretofore this ammonia has been withdrawn by exhausters or fans at the place of formation and then absorbed by sulfuric acid. This method involves on the one hand a rather considerable consumption of sulfuric acid, and on the other hand a further consumption of quicklime or the like in order to liberate the absorbed ammonia and render it available for renewed use in the operation. It is obvious that the considerable amounts of gypsum produced during this treatment are a cumbersome and expensive waste product of the manufacture.

I have discovered that a great improvement is achieved if instead of sulfuric acid we use the aqueous waste liquors resulting from the washing process. Now if these wash liquors are caused to flow down in a tower wherein they are met by an upward current of air containing ammonia, the latter is absorbed and will form copper-ammonia-combinations. If this liquid is then caused to travel in contact with an oppositely flowing current of steam in a column apparatus of well-known character, the ammonia will be expelled and may be absorbed by water and returned to the cycle of operations. This operation will be used for all wash liquors, whether alkaline or acid liquors. The method however acquires increased practical value when alkaline precipitating agents are employed, for instance caustic soda lye containing sugar. During the subsequent washing of the threads with water the adhering soda or the soda previously combined with the molecule of cupracellulose is dissolved, and there is further dissolved, with the assistance of the sugar, a certain portion of the copper, as copper hydroxid, and this remains suspended in the wash liquor. Its separation from these lyes is even difficult. Now if the alkaline wash liquors are caused to flow down in a tower wherein they are met by an upward current of air laden with ammonia, the ammonia is absorbed and forms cuprammonia. Simultaneously the previously dissolved copper hydroxid will be precipitated as brown cuprous oxid. If this cuprous oxid is separated from the alkaline mother lye in any suitable manner, such lye can be used again for expelling the ammonia from the lyes of cuprammonium sulfate, with the addition of further amounts of alkalis, if necessary.

In using acid wash liquors, which contain copper sulfate, etc., firstly ammonia acts as a neutralizing agent and further combines with the copper sulfate forming cuprammonium - sulfate. The combining power of the wash liquors may be further increased by adding to them any suitable salts (*e. g.* calcium chlorid) able to form double compounds containing ammonia. But the proceeding is the same as described with reference to alkaline wash-liquors.

I claim as my invention:—

1. The method of recovering from air ammonia set free in the precipitation of cellulose from a solution of cellulose in cuprammonium, which consists in passing said ammonia-bearing air in contact with liquor in which said cellulose-precipitate has been washed, and again separating the ammonia from said liquor.

2. The method of recovering from air ammonia set free in the percipitation of cellulose from a solution of cellulose in cuprammonium, which consists in passing said ammonia-bearing air in contact with alkaline liquor in which said cellulose-precipitate has been washed, and again separating the ammonia from said liquor.

3. The method of recovering from air ammonia set free in the precipitation of cellulose from a solution of cellulose in cuprammonium, which consists in passing said ammonia-bearing air in contact with liquor in which said cellulose precipitate has been washed, and heating said liquor to expel the ammonia.

4. The method of recovering from air ammonia set free in the precipitation of cellulose from a solution of cellulose in cuprammonium, which consists in passing said ammonia-bearing air in contact with liquor in which said cellulose-precipitate has been washed containing copper hydroxid, and again separating the ammonia from said liquor.

5. The method of recovering from air ammonia set free in the precipitation of cellulose from a solution of cellulose in cuprammonium, which consists in passing said ammonia-bearing air in contact with liquor in which said cellulose-precipitate has been washed, to which have been added substances having an affinity for ammonia, and again separating the ammonia from said liquor.

6. The method of utilizing wash liquors employed in the manufacturing of cellulose precipitates from a solution of cellulose in cuprammonium, which consists in passing said liquors in contact with a stream of ammonia-bearing air, whereby said ammonia is absorbed by said liquors.

7. The method of utilizing alkaline wash liquors containing copper-hydroxid in suspension employed in the manufacturing of cellulose precipitates from a solution of cellulose in cuprammonium, which consists in passing said liquors in contact with a stream of ammonia-bearing air, whereby said ammonia is absorbed by said liquors.

In witness whereof, I have hereunto signed my name in the presence of two subscribing witnesses.

EMILE BRONNERT.

Witnesses:
JOSEPH MILLARD,
W. J. MERTEN.